United States Patent [19]

Zettier et al.

[11] Patent Number: 4,614,598

[45] Date of Patent: Sep. 30, 1986

[54] CENTRIFUGAL SEPARATOR DRUM FOR THE CLARIFICATION AND SEPARATION OF LIQUIDS

[75] Inventors: Karl-Heinz Zettier; Paul Bruning; Reinhard Schmidt; Heinrich Hemfort, all of Oelde, Fed. Rep. of Germany

[73] Assignee: Westfalia Separator AG, Oelde, Fed. Rep. of Germany

[21] Appl. No.: 731,422

[22] Filed: May 7, 1985

Related U.S. Application Data

[63] Continuation of Ser. No. 267,818, May 19, 1981, abandoned.

[30] Foreign Application Priority Data

May 23, 1980 [DE] Fed. Rep. of Germany ....... 3019737

[51] Int. Cl.[4] ....................... B01D 33/02; B04B 11/06

[52] U.S. Cl. .................................... 210/781; 210/377; 210/380.1; 494/41; 494/70

[58] Field of Search ..................... 210/781, 360.1, 371, 210/377, 380.1; 494/41, 70

[56] References Cited

U.S. PATENT DOCUMENTS

| | | | |
|---|---|---|---|
| 785,818 | 3/1905 | Meer | 210/371 |
| 2,144,229 | 1/1939 | Ruda | 210/371 X |
| 2,344,888 | 3/1944 | Lindgren | 210/371 X |
| 2,724,549 | 11/1955 | Brown | 210/371 X |
| 3,360,194 | 12/1967 | Wilsmann | 210/377 X |
| 3,385,443 | 5/1968 | Cuza | 210/377 X |
| 3,640,452 | 2/1972 | Thylefors | 210/371 X |
| 3,642,196 | 2/1972 | Nilsson | 210/371 X |
| 3,924,804 | 12/1975 | Niemeyer | 210/371 X |
| 4,305,817 | 12/1981 | Kohlstette | 210/371 X |

*Primary Examiner*—Robert Spitzer
*Attorney, Agent, or Firm*—Sprung Horn Kramer & Woods

[57] ABSTRACT

Centrifugal separator drum (FIG. 1) for the clarification and separation of liquids, having one or more paring systems 12, 13 for the removal of the clarified or separated liquids, a stationary inlet tube 11 which communicates with a smooth, cylindrical inlet chamber 18, which rotates with the drum and is affixed to the latter, via an opening that is slightly larger than the inlet tube. Outlets ports 20 lead out of the inlet chamber into a forechamber 21 which communicates on the one hand with an annular chamber 24 situated ahead of the inlet chamber and on the other hand with the riser passages 23 of the plate insert 4. According to the invention, the inlet chamber 18 is sealed off from the external atmosphere; the distance from the outlet of the inlet tube 11 to the entry of the outlet ports 20 amounts to at least thrice the inside diameter of the inlet chamber, and the total cross section of the outlet ports is smaller than the cross section of the inlet chamber and larger than the cross section of the inlet tube. The outlet ports have one or more chokes. Thereby, during operation, an increased liquid pressure develops in the lower part of the inlet chamber ahead of the outlet ports and the inlet chamber can be kept largely filled with liquid.

11 Claims, 2 Drawing Figures

CENTRIFUGAL SEPARATOR DRUM FOR THE CLARIFICATION AND SEPARATION OF LIQUIDS

Figure 1:
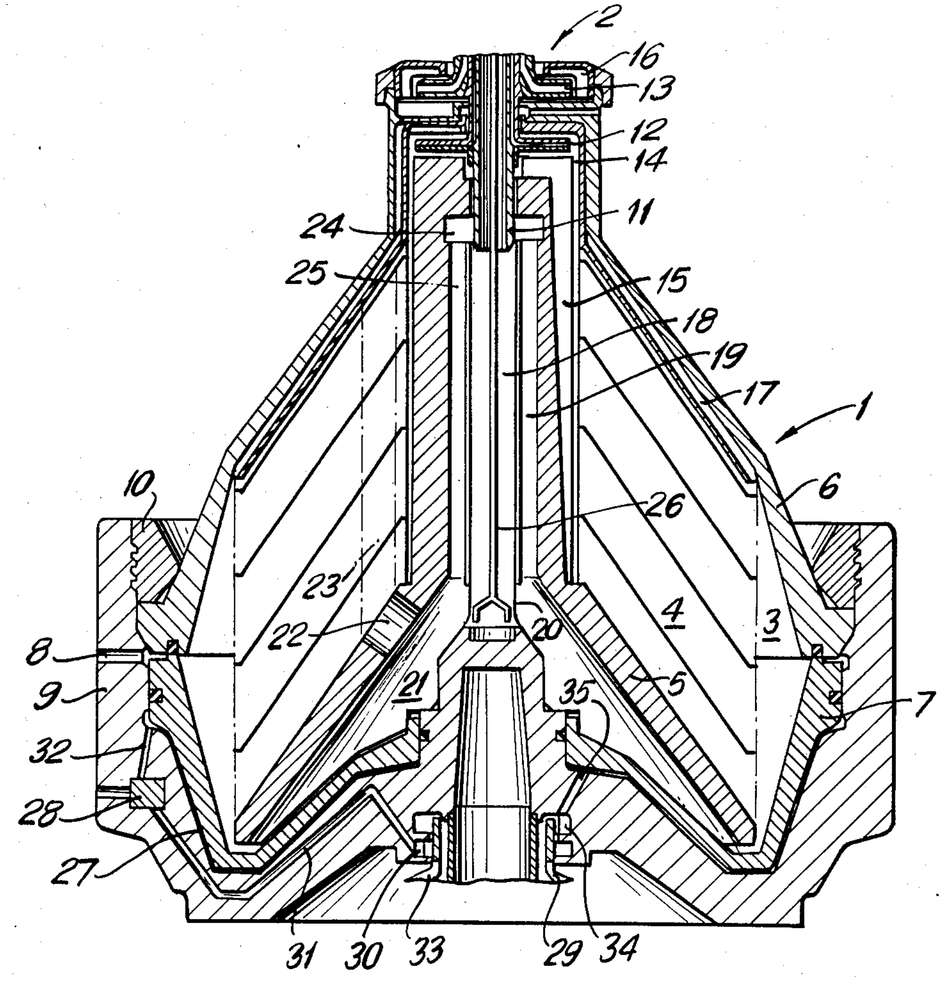

This is a continuation of application Ser. No. 267,818, filed May 19, 1981 now abandoned.

BACKGROUND

The invention relates to a centrifuge for the clarification and separation of liquids, having one or more paring means for the removal of the clarified or separated liquids, having a stationary inlet tube communicating with a smooth, cylindrical inlet chamber, rotating with the drum and fixedly attached thereto, through an opening which is slightly larger than the inlet tube, and outlet ports emerging from the inlet chamber, and discharging into a forechamber which communicates on the one hand through ventilation passages with an annular chamber preceding the inlet chamber, and on the other hand, with the riser passages of the plate insert disposed in the centrifuge drum.

A centrifuge drum of this construction is disclosed, for example, in Swiss Pat. No. 236,747, and was intended to serve so that whole milk could be fed in a gentle and smooth manner to the centrifuge drum so as to prevent the fat globules in the milk from being broken up when the milk enters the drum, since this has an adverse effect on the separation of whole milk into cream and skim milk. This is because the more severely these fat globules are broken up, the greater will be the fat content in the separated skim milk. Furthermore, the entrainment of air at the inlet to the drum is to be largely prevented, since this also interferes with the separation of the milk in the centrifuge.

It has been found, however, that a centrifugal separator drum constructed in this manner is unable to prevent the entrainment of air nor the breaking up and brusting of the fat globules in the milk, nor of other suspended particles or dispersed droplets of the liquids which are to be clarified or separated. The more severely the liquid droplets are broken up the greater will be the centrifugal force needed for the separation, which can be produced, for example, by increasing the drum rotational speed or by increasing the separation surface in the drum.

It is for the reasons given above that airtight centrifuges have been developed, such as those disclosed in German Pat. No. 2,508,503. Such airtight centrifuges are provided with sealing sleeves, frictional ring seals or the like, at the inlet to the drum, so that the inlet of the drum is hermetically sealed against the atmosphere. Owing to the fact that the liquid being centrifuged has to be fed under pressure to these airtight centrifuges, the entire drum is filled with liquid and is under a certain liquid pressure so that a largely gentle and smooth flow of the liquid in the centrifugal separator drum is assured.

The chief disadvantage in airtight centrifuges is to be found, however, in the seals between the stationary inlet and the revolving drum, these seals being subjected to great wear at the high rotatory speeds commonly used today, and have to be constantly cooled or lubricated by liquid during operation. Furthermore, the separators are very expensive to make on account of these seals, and the seals themselves require careful maintenance and treatment.

THE INVENTION

It is the object of the invention to construct a centrifugal separator drum of the kind described in the beginning such that a gentle and smooth flow of liquid will be assured in the centrifuge drum such as occurs in airtight centrifuges, while largely avoiding any very high vacuum or the entrainment of air.

The present invention is based on the knowledge that a gentle and smooth flow of the liquids all the way into the plate insert, combined with the avoidance of any substantial entrainment of air in the drum cannot be achieved unless, after the liquid to be centrifuged has left the fixedly disposed entry tube and entered the revolving drum, the liquid is carried in a constant, uninterrupted stream all the way into the plate insert, while at the same time the liquid is not exposed to any whipping action or to any great pressure variations with the formation of vacuum in the drum, and at the same time the inlet chamber is not in communication with the external atmosphere.

The centrifuge drum represented in Swiss Pat. No. 236,747 has, first of all, openings which connect the inlet chamber of the centrifuge drum with the external atmosphere, so that an unacceptable entrainment of air in the liquid being separated takes place, which is not even prevented by the special inlet chamber provided for in the aforesaid patent. This is because the liquid flowing from the inlet tube into the inlet chamber produces an injector effect which mixes the ambient air with the inflowing liquid, resulting in an unacceptable foaming.

On the other hand, if the rate of infeed is high, the low inlet chamber immediately becomes overflooded, and the liquid is not only driven by the vane members provided in the inlet chamber, but also by the vanes in the distributor, and is subjected to a strong mechanical action, which would be the case even if the openings to the atmosphere were closed.

In the case of an inlet chamber closed off from the atmosphere, on the other hand, such a high vacuum can very easily be formed in the inlet chamber, as well as in the chamber of the distributor, that the liquid will be outgassed at the surface of the liquid ring or liquid film present in the distributor, and the dispersed fluid droplets will burst into minute droplets that are hard to separate.

The object of the present invention is accomplished by closing off the inlet chamber from the external atmosphere, by making the distance between the mouth of the inlet tube and the outlet ports of the inlet chamber to amount to at least three times the inside diameter of the inlet chamber, and by making the total cross section of the outlet ports smaller than the cross section of the inlet chamber and greater than the cross section of the inlet tube, and by providing the outlet ports with one or more chokes, thereby causing an elevated liquid pressure to develop during operation in the lower portion of the inlet chamber ahead of the outlet ports, and the inlet chamber can be kept largely full of the liquid being centrifuged.

By this construction in accordance with the invention, the entrainment of air is prevented, on the one hand, along with the frothing that might result therefrom, and on the other hand, due to the design of the inlet chamber in conjunction with the choke at the outlet ports, the injector effect in the inlet chamber is reduced to a minimum, and hence also the vacuum developing in the inlet area, which results in the bursting of the liquid droplets, is kept within bounds and the liquid is gently guided into the plate insert.

With this construction, too, a minimum diameter of the inlet chamber is combined with a maximum throughput through the centrifuge, without overflooding the inlet chamber.

Additional features of the invention are contained in the claims and in the description of the embodiment.

Figure 2:
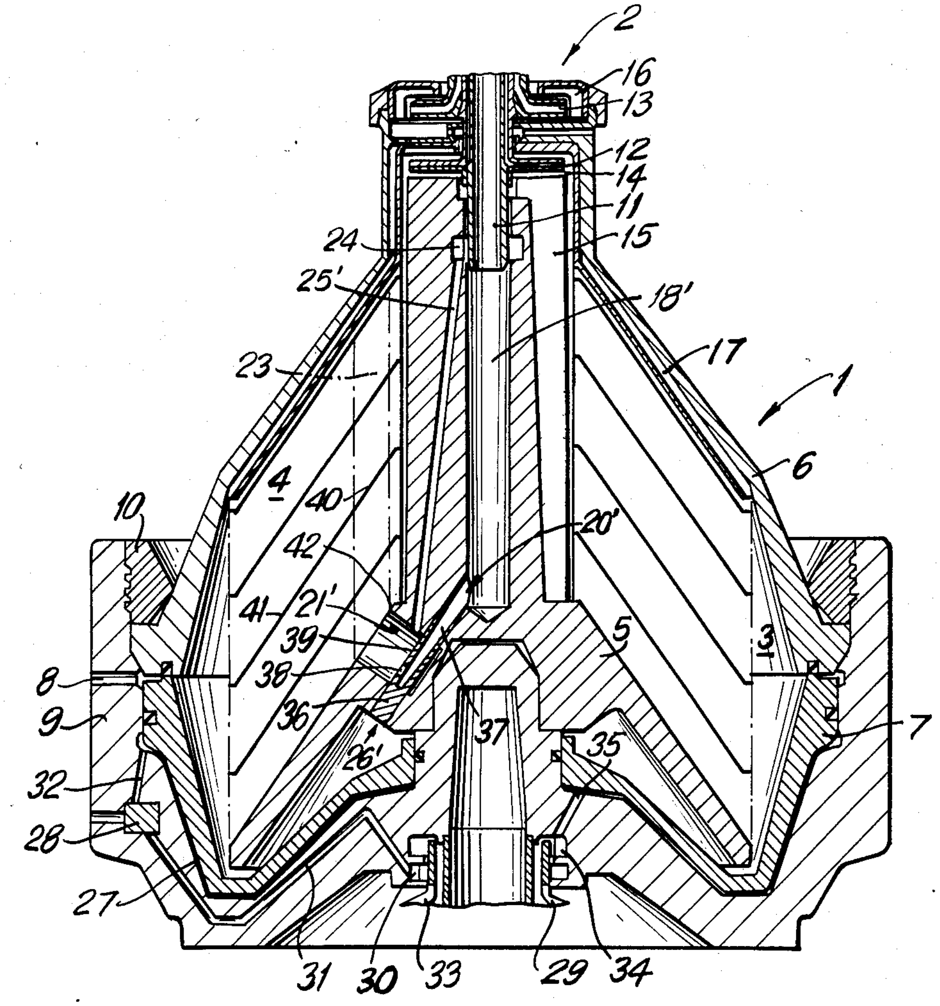

Two embodiments of the invention are described in detail below, in conjunction with the drawing, wherein:

FIG. 1 shows a vertical section through the centrifuge drum having a mechanical choke means at the outlet ports in the inlet chamber, and FIG. 2 is a vertical section through the centrifuge drum having an automatically operating choke means at the outlet port in the inlet chamber.

In FIG. 1, 1 designates a self-emptying rotating centrifugal separator drum in which there is disposed a stationary paring means 2, which is fastened, for example, to a protective hood, which is not shown, surrounding the drum. The centrifugal separator drum consists essentially of the solids chamber 3 with a separating chamber which is formed by a plate insert 4 consisting of a plurality of individual plates which are disposed on a distributor 5. The separating and solids chamber is defined at the top by a drum cover 6, and on the bottom by an axially movably piston 7, which opens and closes outlet openings 8 in the adjoining drum body 9 for the removal of the solids. The drum body and drum cover are held together by a ring 10.

The paring means 2 consists of a central inlet tube 11 on which a lower paring disk 12 is provided for the removal of the specifically light liquid phase, and an upper paring disk 13 for carrying out the specifically heavy liquid phase is fitted. The lower paring disk 12 is disposed in the paring chamber 14 communicating via passages 15 with the separating chamber 4, and the upper paring disk 13 is disposed in the paring chamber 16 which communicates with the separating chamber via a passage 17 between the plate insert 4 and the drum cover 6. The inlet tube 11 extends into a cylindrical and rib-less inlet chamber 18 which is affixed to the driving ribs 19 in the shaft of the distributor 5. The inside diameter of the inlet chamber 18 is approximately 1.4 times greater than the inside diameter of the inlet tube. From the bottom end of the inlet chamber 18 run outlet openings 20 which are disposed at a distance from the mouth of the inlet tube 11 such that the distance amounts to at least three times the inside diameter of the inlet chamber 18. The outlet ports 20 are smaller in total cross section than the cross section of the inlet chamber 18, and greater than the cross section of the inlet tube 11, and they discharge into a forechamber 21 which communicates through openings 22 in the foot of the distributor 5 with the riser passages 23 in the plate insert 4. The forechamber communicates furthermore through passages 25 with an annular chamber 24 above of the inlet chamber 18, these passages 25 being formed by the ribs disposed between the inlet chamber 18 and distributor 5. The passage 25 serves simultaneously as a vent passage for the forechamber 21.

In the central part of the centrifuge drum, there is disposed a piston connected to a rod and constructed as a choke means 26, which can be moved axially within the inlet chamber 18 from outside of the drum, e.g., by a handwheel not illustrated, the piston being able to close and open the outlet ports 20 disposed at the lower end of the inlet chamber.

The centrifugal separator drum of FIG. 1 operates in the following manner. The liquid that is to be clarified or separated is fed to the drum through the central inlet tube 11 at a velocity of flow of at least 5 m/s, and enters into the inlet chamber 18 which is rotating with the drum. Inasmuch as the inside diameter of the inlet chamber 18 is approximately 1.4 times greater than the inside diameter of the inlet tube 11 and the distance between the mouth of the inlet tube and the outlet ports 20 is more than three times greater than the inside diameter of the inlet chamber 18 and the total cross section of the outlet ports 20 is smaller than the cross section of the inlet chamber 18 and greater than the cross section of the inlet tube 11, the inlet chamber 18 will be completely filled with liquid to a point where it nearly overflows into the annular chamber 24 and will be under a higher pressure at the outlet ports 20, so that the fluid can flow gently and smoothly from the outlet ports 20 into the forechamber 21 at a high rate.

Inasmuch as the inlet chamber 18 is filled with liquid to a point close to overflowing, the injector action at the mouth of the inlet tube 11 is very low, so that only a very slight vacuum is present in the annular chamber 24 and in the inlet chamber 18 and in passage 25, thereby preventing any bursting of the fat globules in the milk, for example, or of any other liquid droplets which might tend to form suspensions.

As the throughput varies, the filling of the inlet chamber and hence the reduction of the vacuum that forms can be controlled also mechanically by the piston of the choke means 26 at the outlet ports 20. The vacuum produced in the inlet chamber can be observed by means, for example, of a meter, not shown, disposed in the entrance to the inlet tube 11.

The liquid to be separated, which flows from the outlet ports 20 into the forechamber 21 passes from there through the openings 22 into the riser passages 23 of the plate insert 4, where the separation of the liquids takes place in the usual manner. While the separated, specifically light liquid phase is carried through the passage 15 into the paring chamber 14, and withdrawn under pressure by the paring disk 12 therein, the specifically heavier liquid phase flows to the periphery of the drum and is carried by passages 17 into the paring chamber 16 from which it is withdrawn also under pressure by means of the paring disk 13 disposed therein. The paring disks disposed in the paring chambers and immersed in the rotating liquid prevent the entrance of air from the outer drum atmosphere into the inlet chamber, and this prevents any entrainment of air into the liquid entering the inlet chamber 18.

In the case of the self-emptying centrifugal separating drum represented in the example, solid material separated in the separating chamber collects in the solids chamber 3 from which the solids are discharged by partial or complete emptying, in a known manner. For this purpose the closing chamber 27, which is filled with closing fluid and situated under the piston 7, is emptied; for this purpose a centrifugal valve 28 disposed in the drum body 9 is actuated by control fluid through line 29, annular passage 30 and passage 31, opening the passage 32 to release the closing fluid from the closing chamber 27. Under the action of the pressure of the liquid in the separating and solids chamber, the piston 7 is forced to its lower axial position, so that the outlet openings 8 are released for the ejection of the solids.

For the closing action, closing fluid is injected again through line 33, annular passage 34 and passage 35 into the closing chamber.

On account of the gentle treatment of the liquid, with the avoidance of any great amount of vacuum, and the reduction of the disintegration or bursting of the individual liquid droplets which this makes possible, a greater separating efficiency can be achieved in a given size of separator, or the rotatory speed of the drum can be reduced.

In FIG. 2, a number of outlet ports 20′ are disposed at the end of the inlet chamber 18′, corresponding to the number of the riser passages 23 in the plate insert 4; these lead to chokes 26′ in the distributor 5′, which consist each of a branch passage 37 within a tube 36, the branch passage tapering towards the discharge end; each branch passage has two discharge orifices 38 and 39 discharging into the forechamber 21′ associated with the riser passages 23, the cross section of the forechamber corresponding approximately to the cross section of the apertures 40 in plates 41 of plate insert 4 forming the riser passages 23. The discharge orifice 39 in the branch passage 37 is closer to the drum axis and is smaller in cross section than the outlet orifice 38 which is situated farther outwardly from the drum axis, the smaller outlet orifice 39 being situated on a smaller diameter of the drum than the inner edge 42 of the riser passage 23. The mouth of the vent passage 25′ is situated within the forechamber 21′ adjacent the outlet orifice 39, and this vent passage 25′ leads to an annular chamber 24 situated above the inlet chamber 18′.

The construction of the centrifugal separator drum represented in FIG. 2 is the same in all other respects as that in FIG. 1.

The drum of FIG. 2 operates in the following manner. The liquid which is to be separated is fed to the centrifugal separator drum, as described in conjunction with FIG. 1, through the central inlet tube 11, flows into the inlet chamber 18′ where, when the inlet chamber 18′ is full, an elevated pressure develops in the bottom area of the inlet chamber ahead of the ports 20′ so that the liquid can flow gently and smoothly into the branch passage 37 which is in the form of the choke 26′. To prevent the liquid under pressure in the branch passages 37 from being subjected to an abrupt drop in pressure such as to cause disintegration of the liquid droplets, the branch passages 37 are of a tapered configuration, so that the liquid pressure diminishes slowly until the liquid enters into the forechamber 21′, and hardly any gas bound in the liquid is released. While the liquid being separated flows mainly through the outlet orifice 38 into the forechamber 21′ and on into the riser passages 23, any gas that might be released from the liquid in the branch passages 37 will escape through the outlet orifice 39 into the forechamber 21′ and through the vent passage 25′ into the annular chamber 24. The gas collecting in this annular chamber is again entrained by the injector effect of the liquid flowing out of the inlet tube 11 and becomes largely redissolved. Due to the fact that the outlet orifice 39 is set close to the mouth of the venting passage 25′ and is situated on a smaller diameter with respect to the inner edge 42 of the riser passage 23, any gas that may be further released will flow not into the plate insert to have an adverse effect on the separation of the liquids, but will flow out of the forechamber 21′ directly into the vent passage 25′.

Due to the relief of the pressure on the liquids in the branch passages 37, a permanent gas bubble can form in this passage, which will add an additional constriction to the constriction already present in the choke. The size of this gas bubble increases as the throughput decreases thereby automatically increasing its own constricting action, and thus compensating for the decrease of the action of the solid choke such that the total resistance will remain so great that the degree to which the inlet chamber is filled will remain approximately constant and thus no vacuum will be produced. At the same time, however, a continuous stream of liquid past the choke bubble will be sustained.

Due to the system of the invention, the liquid stream is handled in a largely gentle and smooth manner all the way into the riser passages.

What is claimed is:

1. A method of centrifugally separating liquids comprising providing a centrifugal drum separator having at least one paring means for the removal of the clarified or separated liquids, a stationary open inlet tube with an outlet which communicates through an opening with a smooth, cylindrical inlet chamber, rotatable with the drum and affixed thereto, a forechamber for receiving liquid from the inlet chamber, and a separating chamber for the clarification and separation, said inlet chamber having outlet ports which are axially spaced from said opening and lead out of the inlet chamber into the forechamber; feeding liquid into the inlet tube at a velocity of at least 5 m/s; disposing the outlet of the inlet tube at a distance of at least thrice the inside diameter of the inlet chamber from the entry of the outlet ports; providing the total cross section of the outlet ports to be larger than the cross section of the inlet tube and smaller than the cross section of the inlet chamber and the inside diameter of the inlet chamber to be about 1.4 times larger than the inside diameter of the inlet tube; choking the flow from the outlet ports to the forechamber to increase the liquid pressure in the lower part of the inlet chamber ahead of the outlet ports to keep the inlet chamber substantially filled with liquid; and venting gas released from the liquid in the forechamber to an annular chamber at the outlet of the inlet tube to be entrained by the liquid flowing out of the inlet tube and into the inlet chamber.

2. In a centrifugal drum separator for the clarification and separation of liquids, having at least one paring means for the removal of the clarified or separated liquids, a stationary open inlet tube with an outlet, a smooth, cylindrical inlet chamber, rotatable with the drum and affixed thereto and receptive of liquid from the stationary inlet tube, a forechamber for receiving liquid from the inlet chamber, and a separating chamber for the clarification and separation, said inlet chamber having outlet ports which are axially spaced from said opening and lead out of the inlet chamber into the forechamber which communicates with the separating chamber, the improvement wherein: the distance from the outlet in the inlet tube to the entry of the outlet ports of the inlet chamber is at least thrice the inside diameter of the inlet chamber, the total cross section of the outlet ports is smaller than the cross section of the inlet chamber and larger than the cross section of the inlet tube, the inside diameter of the inlet chamber is larger by about 1.4 times than the inside diameter of the inlet tube, choke means disposed at the outlet ports of the inlet chamber and upstream of the forechamber for increasing the liquid pressure in the lower part of the inlet chamber upstream of the outlet ports to keep the inlet chamber substantially filled with liquids during the feeding of liquid into the drum, means forming an annular chamber at the outlet of the inlet tube and in communication with the inlet tube and means forming at least one vent passage from the forechamber to the annular chamber to provide a vent for gas released from the liquid, whereby gas collecting in the annular chamber is entrained by the liquid flowing out of the inlet tube and into the inlet chamber.

3. The centrifugal drum separator of claim 2, wherein the paring means comprises at least one paring disk.

4. The centrifugal drum separator of claim 2, wherein the choke means comprises a piston disposed in the inlet chamber and overlapping the outlet ports and means for axially moving same.

5. The centrifugal drum separator of claim 2, wherein the choke means comprises a plate insert having at least one riser passage and disposed in the separating chamber, and wherein each riser passage has one outlet port associated therewith.

6. The centrifugal drum separator of claim 5, further comprising one forechamber associated with each outlet port-riser passage and wherein the choke means comprises a single closed branch passage for each forechamber having outlet ports, with each discharging into its forechamber.

7. The centrifugal drum separator of claim 6, wherein the branch passages taper toward the outlet end thereof.

8. The centrifugal drum separator of claim 6, wherein the outlet ports of each branch passage are radially spaced, with the outlet port situated nearer to the drum axis being smaller in cross section than the outlet port situated further outwardly toward the periphery of the drum.

9. The centrifugal drum separator of claim 8, wherein the smaller outlet orifice lies on a smaller drum diameter than the inner edge of the riser passage of the plate insert.

10. The centrifugal drum separator of claim 9, wherein each forechamber has one vent passage having an inlet orifice disposed adjacent the smaller outlet orifice of the corresponding branch passage.

11. The centrifugal drum separator of claim 10, wherein the cross section of each forechamber is about equal to the cross section of the corresponding riser passage.

* * * * *